(12) United States Patent
Furuhashi et al.

(10) Patent No.: US 6,411,294 B1
(45) Date of Patent: Jun. 25, 2002

(54) IMAGE DISPLAY APPARATUS AND IMAGE DISPLAY METHOD

(75) Inventors: Shinichi Furuhashi; Toshiyuki Kaji, both of Tokyo (JP)

(73) Assignee: Sega Enterprises, Ltd. (JP)

( * ) Notice: Subject to any disclaimer, the term of this patent is extended or adjusted under 35 U.S.C. 154(b) by 0 days.

(21) Appl. No.: 09/265,888

(22) Filed: Mar. 11, 1999

(30) Foreign Application Priority Data

Mar. 12, 1998 (JP) .......................................... 10-061744

(51) Int. Cl.[7] .............................................. G06T 15/40
(52) U.S. Cl. .................. 345/421; 345/422; 345/426; 345/589; 345/592; 345/593; 345/582
(58) Field of Search ................................. 345/421, 422, 345/441, 419, 420, 426, 592, 593, 589, 428, 582

(56) References Cited

U.S. PATENT DOCUMENTS 5,856,829 A * 1/1999 Gray, III et al. ............ 345/422
5,923,333 A * 7/1999 Stroyan ...................... 345/422
5,977,987 A * 11/1999 Duluk, Jr. .................. 345/441

* cited by examiner

Primary Examiner—Mark Zimmerman
Assistant Examiner—Kimbinh T. Nguyen
(74) Attorney, Agent, or Firm—Dickstein Shapiro Morin & Oshinsky LLP

(57) ABSTRACT

The image display apparatus of the present invention examines the transparency of a pixel to determine whether the Z coordinate of the pixel should be written in the depth buffer. Therefore, when the objects which are constituted by polygons, wherein opaque pixels and translucent pixels coexist, intersect each other, the variation in the display of image patterns which are to be displayed is increased. Since the writing control is performed under simple conditions, i.e., in accordance with the transparency of a pixel, an image closer to the ideal one can be selected without substantially increasing the load imposed on the rendering circuit.

3 Claims, 6 Drawing Sheets

IMAGE DISPLAY APPARATUS AND IMAGE DISPLAY METHOD

BACKGROUND OF THE INVENTION

1. Field of the Invention

The present invention relates to an image display apparatus, for computer graphics (CG), for displaying an object which includes polygons wherein opaque pixels and translucent pixels coexist, and an image display method therefor.

2. Related Arts

According to computer graphic (CG) techniques, an object in virtual three-dimensional space is constituted by at least one polygon. Each polygon is itself constituted by at least one pixel. In order to display such an object on an image display apparatus, virtual three-dimensional space is converted to provide a two-dimensional plane which corresponds to the screen of an image display apparatus, and the object is displayed on the two-dimensional plane.

Therefore, when a plurality of objects are located in the direction of depth (hereinafter referred to as direction Z) in virtual three-dimensional space, of these objects a foreground object is displayed on the screen of the image display apparatus.

To exercise this control, a conventional image display apparatus includes a depth buffer in which the coordinate in direction Z (hereinafter referred to as a Z coordinate) of an object is written. When the Z coordinate of a specific object is written in the depth buffer, and when the Z coordinate of another object, which is to be drawn later, is located deeper than the Z coordinate stored in the depth buffer, the second object is not displayed. Conventionally, the Z coordinate of an object is written for each polygon which constitutes the object.

In the control of the display of an object using the depth buffer, when a plurality of objects are constituted by translucent polygons, which include translucent pixels (opaque pixels may coexist), an object having the deepest Z coordinate is drawn first. As a result, the objects can be so displayed that the objects located deeper in direction Z can be seen through the translucent portion of the foreground object.

Assume that when an object having the deepest Z coordinate can not be drawn first, i.e., when the Z coordinate of an object to be drawn later is deeper than is the Z coordinate of an object which was drawn previously. Since the object to be drawn later is located deeper than is the Z coordinate stored in the depth buffer, this object is not displayed on the screen. Therefore, a display can not be provided on which an object drawn later can be visible through the translucent portion of another object which was drawn earlier.

In addition, if the Z coordinate of an object which was drawn earlier is not written in the depth buffer, when another object is drawn later, that object could would be displayed on the screen. However, in this case, although the object to be drawn later is located deeper than is the earlier drawn object, the object drawn later is displayed as though it should appear in front of the object drawn earlier.

Therefore, to draw a plurality of objects in which translucent polygons are included, the object located deepest in the Z direction must be first drawn. However, when the objects intersect each other in the Z direction, i.e., when one part of an object to be drawn later is located deeper than the object which was drawn earlier, the above described shortcoming arises.

As is described above, when objects which are constituted by translucent polygons intersect each other in the Z direction, the relationship of the positions as they pertain to the depth of the translucent polygons can not be correctly represented by employing a presently available, conventional writing control process for a depth buffer.

In order to resolve this shortcoming, conventionally, proposed is a method according to which each translucent polygon is divided at the intersecting portion. However, this method is not preferable because of the increased processing load which is imposed on the image display apparatus.

An image display apparatus is proposed with which processing for each of the pixels constituting a polygon is performed. However, with such an image display apparatus an enormous amount of image display processing is necessary, and this is not acceptable for an image display apparatus, such as a video game machine, for which real-time and interactive processing are required.

SUMMARY OF THE INVENTION

It is one objective of the present invention to provide an image display apparatus which can adequately display translucent polygons without increasing the processing load, and an image display method therefor.

To achieve the above objective, according to the present invention, an image display apparatus for displaying polygons, each of which is located in a virtual three-dimensional space of an XYZ coordinate system based on a viewpoint and is constituted by at least one pixel having XYZ coordinates, on the two-dimensional plane of an XY coordinate system comprises:

- a storage unit in which a Z coordinate corresponding to predetermined XY coordinates is written;
- a determination unit for determining the transparency of the pixel;
- a writing control unit for controlling the writing of the Z coordinate of the pixel into the storage unit based on the results obtained by the determination unit; and
- a display unit for displaying, at the predetermined XY coordinates, a pixel having the Z coordinate written in the storage unit and/or the Z coordinate nearer to the viewpoint than the Z coordinate written in the storage unit.

The determination unit determines, for example, whether a pixel is opaque. A first flag is set for controlling the writing of the Z coordinate of an opaque pixel in the storage unit, and a second flag is set for controlling the writing of the Z coordinate of a pixel which is not opaque. In accordance with the states of the first and the second flags, the writing control unit controls the writing the Z coordinate of the pixel which is opaque and which is not opaque into the storage unit respectively.

Furthermore, to achieve the above objective, according to the present invention, an image display method for displaying polygons, each of which is located in the virtual three-dimensional space of an XYZ coordinate system based on a viewpoint and is constituted by at least one pixel having XYZ coordinates, on the two-dimensional plane of an XY coordinate system comprises:

- a determination step for determining a transparency of the pixel;
- a control step for controlling the writing of the Z coordinate of the pixel into a storage unit based on the results obtained by the determination step; and
- a display step for displaying, at predetermined XY coordinates, a pixel having the Z coordinate written in the storage unit and/or the Z coordinate nearer to the viewpoint than the Z coordinate written in the storage unit.

At the determination step, for example, a check is performed to determine whether a pixel is opaque. A first flag is set for controlling the writing of the Z coordinate of an opaque pixel in the storage unit, and a second flag is set for controlling the writing of the Z coordinate of a pixel which is not opaque. At the control step, the writing the Z coordinates of the pixel which is opaque and not opaque into the storage unit is controlled in accordance with the states of the first and the second flags respectively.

DETAILED DESCRIPTION OF THE PREFERRED EMBODIMENT

The preferred embodiment of the present invention will now be described. It should be noted, however, that the technical scope of the present invention is not limited to this embodiment.

Figure 1:
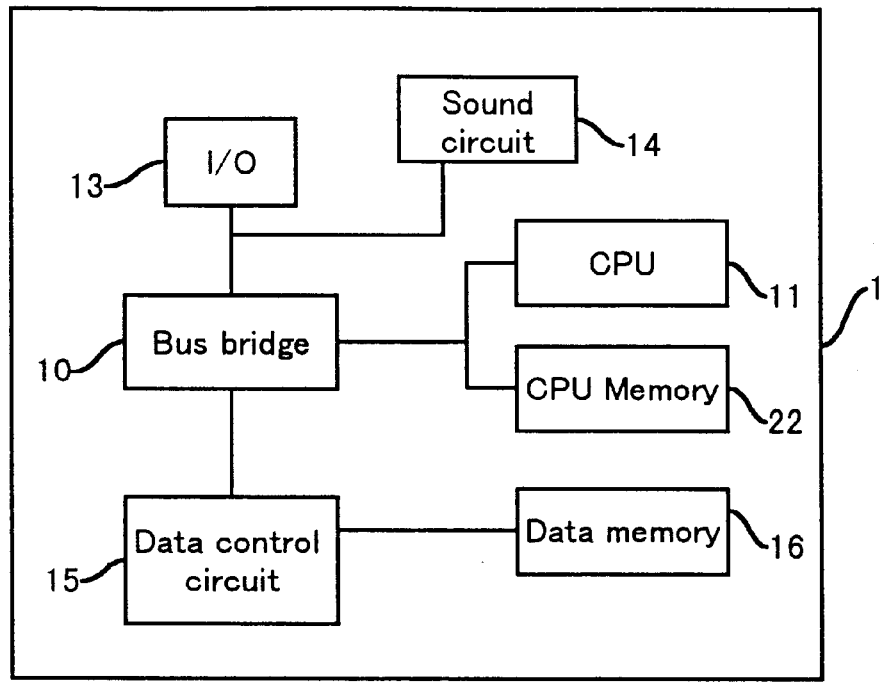
FIG. 1 is a block diagram illustrating the arrangement of an image display apparatus according to one embodiment of the present invention.
Figure 1:
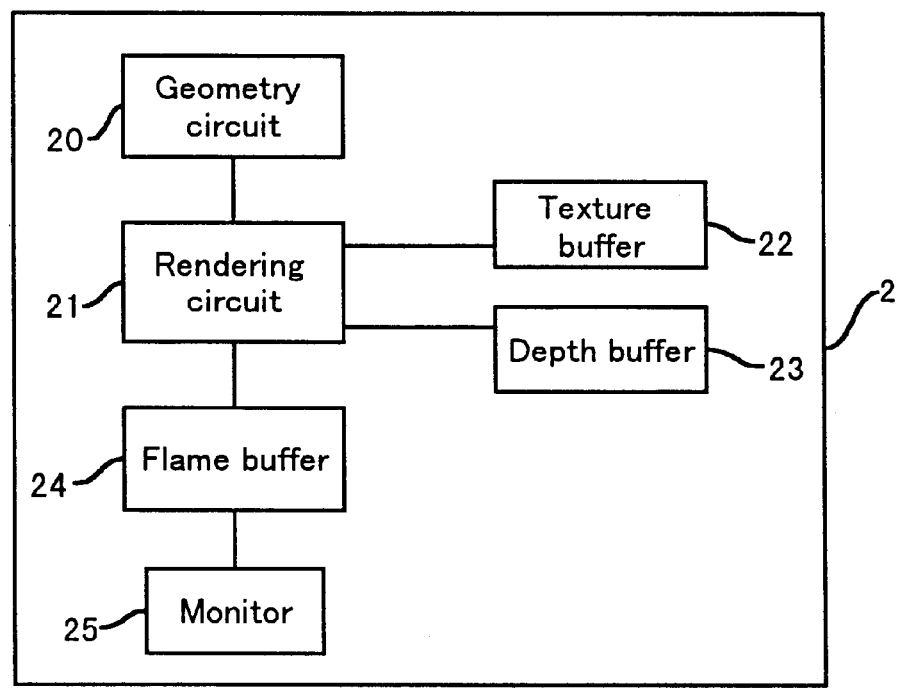

FIG. 1 is a block diagram illustrating the arrangement of an image display apparatus according to one embodiment of the present invention. In FIG. 1, the image display apparatus comprises a control unit 1 and an image processing unit 2. In the control unit 1, a CPU 11 and a CPU memory 22, including a BIOS-ROM, communicate with an I/O interface 13 and a sound circuit 14 across a bus bridge 10.

When power is turned on and the BIOS of the CPU memory 12 is activated, program data stored in an external memory (not shown) are read through the I/O interface 13 by the CPU 11, and are stored via a data control circuit 15 in a data memory 16.

The data stored in the data memory 16 include those for a register set function and those for a plurality of polygons, which constitute a plurality of objects which are to be displayed by the program on a monitor 25 in the image processing unit 2. The polygon data include vertex data for polygons (vertex coordinates, vertex color, texture map coordinates, transparency, normal vectors, etc.).

The polygon data in the data memory 16 are transmitted to a geometry circuit 20 by the data control circuit 15. The geometry circuit 20 employs the vertex coordinates of a polygon to position the polygon in a predetermined three-dimensional virtual space. A viewport is determined to define the area in virtual three-dimensional space which is to be displayed, and the luminance of the polygon is calculated in accordance with the normal line vector. The vertex coordinates of the parts of a polygon that extends outside the viewport are removed, i.e., clipping is performed.

The vertex coordinates of the polygon which are located inside the viewport are transformed into three-dimensional coordinates of a viewpoint system which employs a predetermined viewpoint.

The polygon data, to which the three-dimensional vertex coordinates of the viewpoint system apply, are transmitted to a rendering circuit 21. The rendering circuit 21 includes a painting circuit, a texture mapping circuit, a depth comparison circuit and a blending circuit (none of them shown), which together constitute an image processor.

The painting circuit calculates such information as the coordinates of the pixels which lie within the range enclosed by the vertexes of a polygon, and transmits the obtained information to the other circuits in the rendering circuit 21.

The texture mapping circuit reads from a texture map, which is stored in a texture buffer 22, texture data corresponding to the individual pixels, and pastes the texture on the pixels. The texture data include color information (red, green and blue information) and transparency information.

The depth (Z direction) comparison circuit compares the positional relationship of a plurality of polygons. As will be described later, when a depth buffer write control flag, which is set in advance, is set to ON, the Z coordinate of a pixel in a polygon which is to be located in the foreground in the direction of depth (the Z direction) is stored in a depth buffer 23. That is, of the three-dimensional coordinates (X, Y, Z), the Z coordinate of a pixel, which has been already written in the depth buffer 23, is compared with the Z coordinate of a pixel which constitutes a different polygon and which has the same X and Y coordinates as the specified pixel. When the Z coordinate of the pixel constituting the different polygon is located in front, the Z coordinate stored in the depth buffer 23 for the X and Y coordinates is updated to the Z coordinate of the pixel which constitutes the different polygon.

The blending circuit blends the colors of pixels which overlap at the same X and Y coordinates in the order at which these polygons have been drawn.

The pixel data thus processed by the rendering circuit 21 are transmitted to a frame buffer 24 in which are stored data for one screen of the monitor 25. The pixel data stored in the frame buffer 24 are sequentially transmitted to the monitor 25 for display as images.

In this embodiment, the Z coordinate is written in the depth buffer 23 for each pixel, not for each polygon, as in the prior art.

Figure 2:
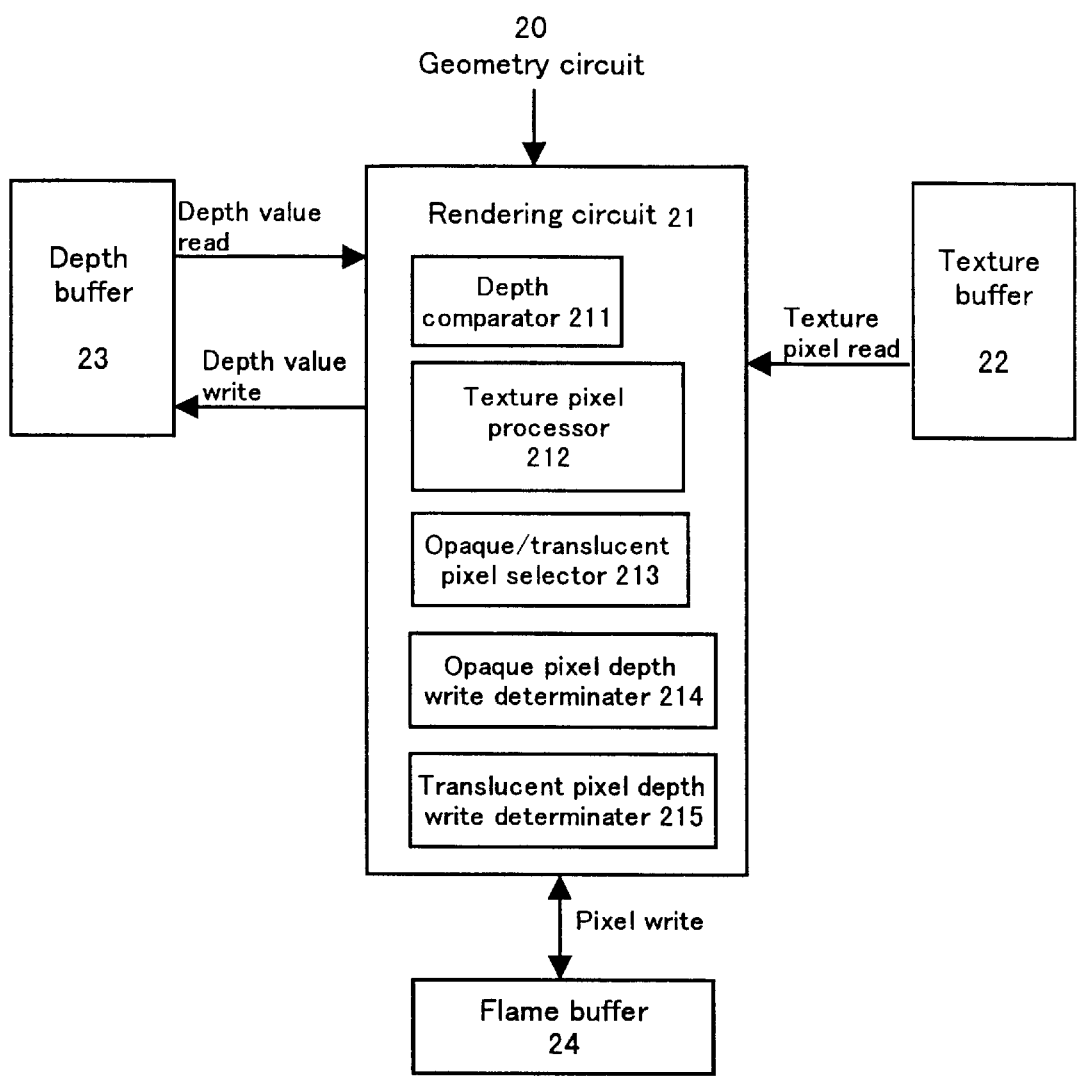
FIG. 2 is a block diagram illustrating the arrangement of a rendering circuit in FIG. 1 for writing the Z coordinate in a depth buffer.

FIG. 2 is a block diagram illustrating the arrangement of the rendering circuit 21 in FIG. 1 for writing the Z coordinate in the depth buffer 23. In FIG. 2, the rendering circuit 21 in this embodiment includes a depth comparator 211, which is the same as the above described depth comparison circuit; a texture pixel processor 212, which is constituted by the above described painting circuit and the texture mapping circuit; an opaque/translucent pixel selector 213; an opaque pixel depth write determiner 214; and a translucent pixel depth write determiner 215.

The opaque/translucent pixel selector 213 employs transparency a of the texture to be mapped to pixels which constitute individual polygons in order to determine whether the pixels are opaque or are translucent. As texture data, the pixel includes transparency information ($\alpha$) in addition to the color information (red, green and blue information). Specifically, a pixel for which $\beta=1$ is an opaque pixel, a pixel for which $\beta=0$ is a transparent pixel, and a pixel for which $0<\beta<1$ is a translucent pixel.

The opaque pixel depth write determiner 214 determines whether the Z coordinate of an opaque pixel selected by the opaque/translucent pixel selector 213 should be written in the depth buffer 23. Specifically, when an opaque pixel depth write flag, which is set in advance, is set to ON, the opaque pixel depth write determiner 214 writes the Z coordinate (depth value) of the opaque pixel in the depth buffer 23. When the depth write flag is set to OFF, the opaque pixel depth write determiner 214 does not write the Z coordinate (depth value) of the opaque pixel in the depth buffer 23.

The translucent pixel depth write determiner 215 determines whether the Z coordinate of a translucent pixel selected by the opaque/translucent pixel selector 213 should be written in the depth buffer 23. Specifically, when a translucent pixel depth write flag, which is set in advance, is set to ON, the translucent pixel depth write determiner 215 writes the Z coordinate (depth value) of the translucent pixel in the depth buffer 23. When the depth write flag is set to OFF, the translucent pixel depth write determiner 215 does not write the Z coordinate (depth value) of the translucent pixel in the depth buffer 23.

Figure 3:
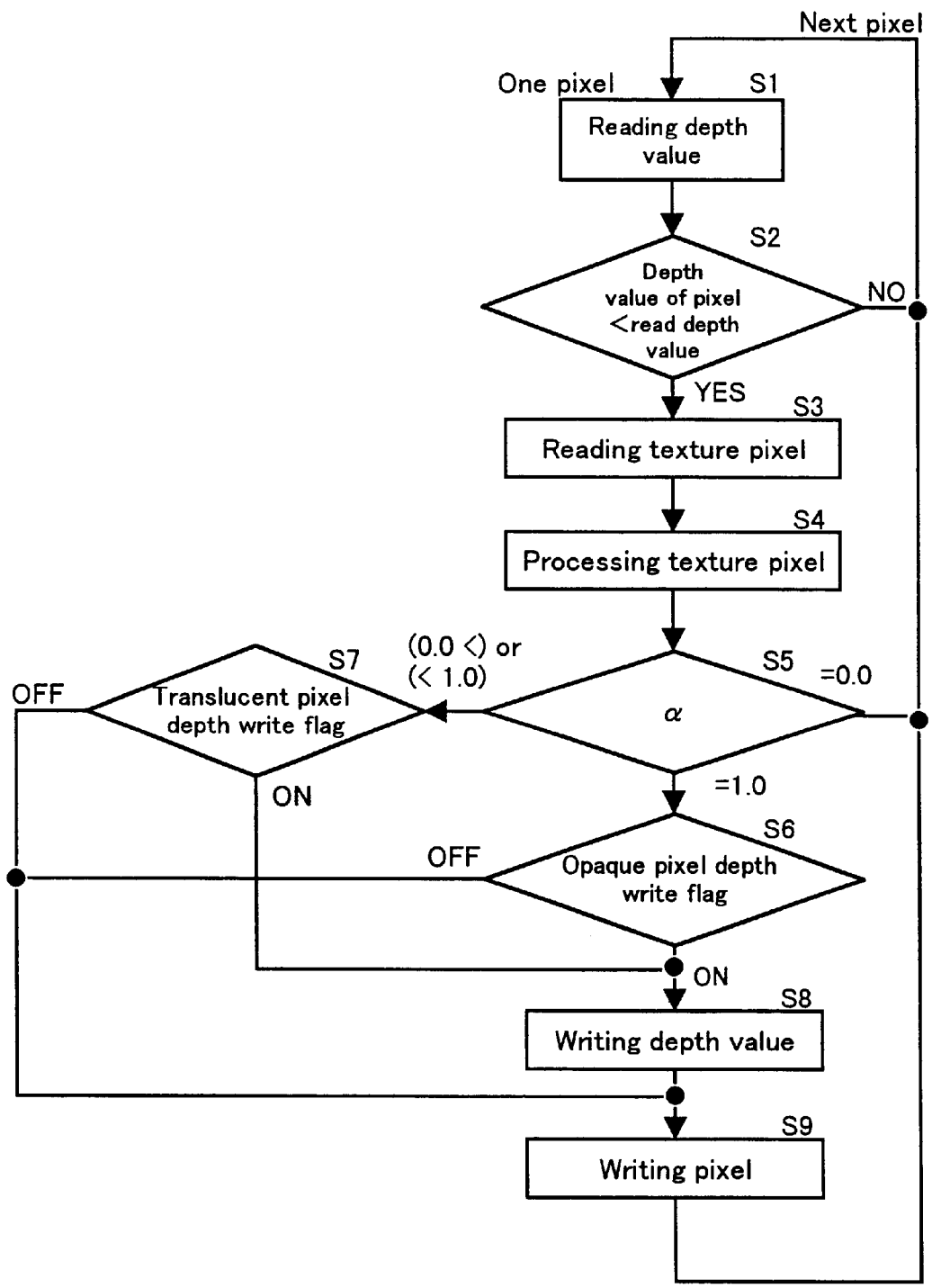
FIG. 3 is a flowchart showing the processing performed by the rendering circuit of the image display apparatus according to the embodiment of the present invention when writing the Z coordinate of a pixel in the depth buffer.

FIG. 3 is a flowchart showing the processing, performed by the rendering circuit 21 of the image display apparatus according to the embodiment of the present invention, for writing the Z coordinate of a pixel in the depth buffer 23. In FIG. 3, at step S1 is performed the reading of the Z coordinates of the pixels which are sequentially transmitted to the rendering circuit 21 and the Z coordinates which are stored in the depth buffer 23 and correspond to the X and Y coordinates of these pixels.

At step S2 the depth comparator 211 compares the Z coordinates. If the Z coordinate of a pixel which is input is greater (deeper) than is the Z coordinate stored in the depth buffer, the pertinent pixel is not displayed and is abandoned. Program control returns to step S1, whereat the next pixel is read.

When the Z coordinate of the pixel which is input is smaller (nearer) than is the Z coordinate stored in the depth buffer 23, process moves to step S3, whereat a texture element (hereinafter referred to as a texel) corresponding to the pixel is read from the texture buffer 22. The texel is the minimum constituent unit for a texture map stored in the texture buffer 22. At step S4 a predetermined process, such as the mapping of texels, is performed for the pixel.

At step S5 the transparency a of the pixel on which the texel is mapped is determined by the opaque/translucent selector 213. When at step S5 $\beta=0$ (transparent), the pertinent pixel is transparent. Therefore, process returns to step S1.

When $\beta=1$ (opaque), process advances to step S6, whereat the opaque pixel depth write determiner 214 determines whether the Z coordinate of a pixel should be written to the depth buffer 23. That is, when the opaque pixel depth write flag is set to ON, at step S8 the Z coordinate of the opaque pixel is written in the depth buffer 23 (writing depth value). When that depth write flag is set to OFF, the Z coordinate of the opaque pixel is not written in the depth buffer 23.

When $0<\beta<1$ (translucent pixel), process goes to step S7, whereat the translucent pixel depth write determiner 215 determines whether the Z coordinate of a pixel should be written in the depth buffer 23. That is, when the translucent pixel depth write flag is set to ON, at step S8 the Z coordinate of the translucent pixel is written in the depth buffer 23 (writing depth value). When that depth write flag is set to OFF, the Z coordinate of the translucent pixel is not written in the depth buffer 23.

At step S9 the pixel data obtained at the above steps are written in the frame buffer 24 (writing pixel).

FIGS. 4 to 9 are diagrams showing example image displays, which are obtained by using the flowchart in FIG. 3, when objects which are constituted by polygons wherein opaque pixels and translucent pixels coexist intersect each other in the Z direction. The ideal display of intersecting objects is shown in FIG. 10. Specifically, a prism 200 appears to penetrate a plane 100. The plane 100 can be seen through a translucent portion 200 of the prism 200, which is displayed above a portion 300 (see FIG. 10) whereat the plane 100 and the prism 200 intersect each other. Below the intersecting portion 300 (see FIG. 10), the prism 200 can be seen through a translucent portion 101 of the plane 100. Further, no image can be seen through opaque portions 102 and 202 of the plane 100 and the prism 200, respectively.

For this image display, while whether each of the pixels of an object should be written in the depth buffer must be determined, a large hardware component is required because an enormous amount of calculations must be performed. However, in this embodiment, as is described above, as simple a structure as is possible can be employed to obtain an image close to the ideal image in FIG. 10, without depending on a large hardware circuit.

Figure 4:
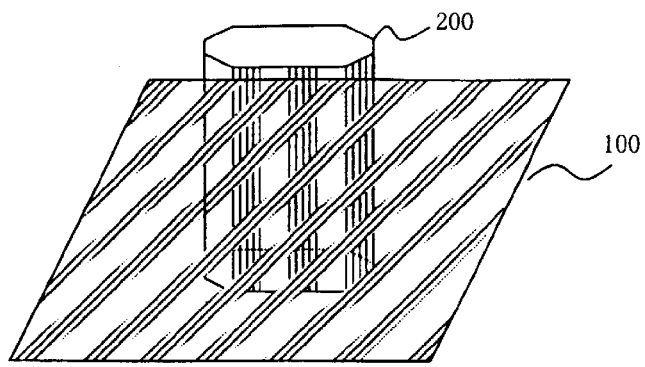
FIG. 4 is a diagram showing an example image display (1) according to the embodiment of the present invention.

In FIG. 4 is shown an image display when the opaque pixel depth write flag and the translucent pixel depth write flag are in the OFF state, i.e., when the Z coordinates of an opaque pixel and a translucent pixel are not written to the depth buffer 23 and when the prism 200 is drawn earlier than the plane 100.

When the image in FIG. 4 is compared with that in FIG. 10, the prism 200, which should be displayed in front of the plane 100, is displayed behind the plane 100 at a portion extending above the intersecting portion 300 (see FIG. 10), whereat the plane 100 and the prism 200 overlap.

Figure 5:
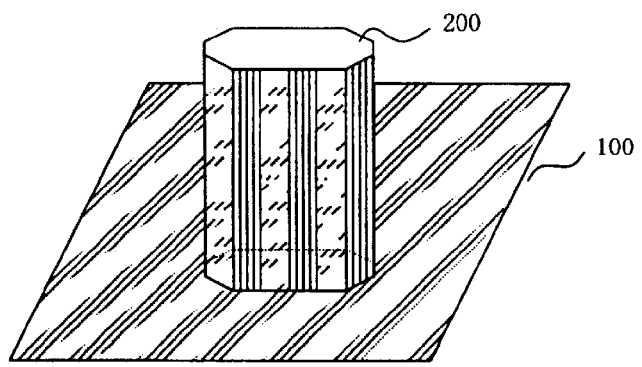
FIG. 5 is a diagram showing an example image display (2) according to the embodiment of the present invention.

In FIG. 5 is shown an image display when the opaque pixel depth write flag and the translucent pixel depth write are in the OFF state and when the plane 100 is drawn earlier than the prism 200.

When the image in FIG. 5 is compared with that in FIG. 10, the prism 200, which should be displayed behind the plane 100, is displayed in front of the plane 100 at a portion below the intersecting portion 300 (see FIG. 10) whereat the plane 100 and the prism 200 overlap.

The images in FIGS. 4 and 5 are the same as those obtained when the Z coordinates of the polygons are not written in the depth buffer in the conventional process during which writing in the depth buffer is performed for each polygon.

Figure 6:
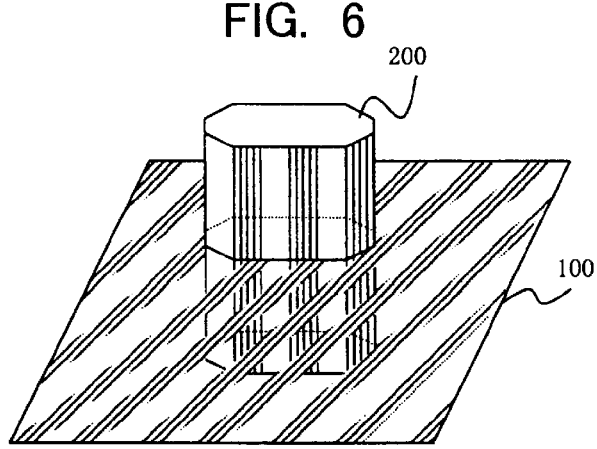
FIG. 6 is a diagram showing an example image display (3) according to the embodiment of the present invention.

In FIG. 6 is shown an image display when the opaque pixel depth write flag and the translucent pixel depth write flag are in the ON state, i.e., when the Z coordinates of an opaque pixel and a translucent pixel are written in the depth buffer 23 and when the prism 200 is drawn earlier than is the plane 100.

When the image in FIG. 6 is compared with that in FIG. 10, the plane 100, which should be so displayed that it can be seen through the prism 200, is not displayed at a portion above the intersecting portion 300 (see FIG. 10) whereat the plane 100 and the prism 200 overlap.

Figure 7:
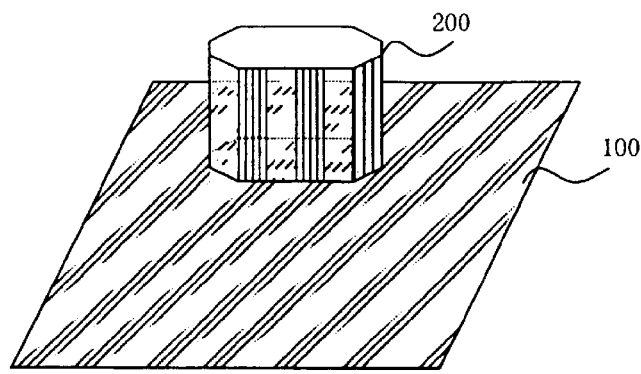
FIG. 7 is a diagram showing an example image display (4) according to the embodiment of the present invention.

In FIG. 7 is shown an image display when the opaque pixel depth write flag and the translucent pixel depth write are in the ON state and when the prism 200 is drawn earlier than the plane 100.

When the image in FIG. 7 is compared with that in FIG. 10, the prism 200, which should be displayed so that it can be seen through the plane 100, is not displayed at a portion below the intersecting portion 300 (see FIG. 10) whereat the plane 100 and the prism 200 overlap.

The images in FIGS. 6 and 7 are the same as those obtained when the Z coordinates of the polygons are written to the depth buffer in the conventional process during which writing in the depth buffer is performed for each polygon.

Therefore, the images in FIGS. 4 to 7 can be obtained by the conventional process during which writing control in the depth buffer is performed for each polygon. However, the images shown in FIGS. 8 and 9 can not be acquired by the conventional process, but can be by the preferred embodiment.

Figure 8:
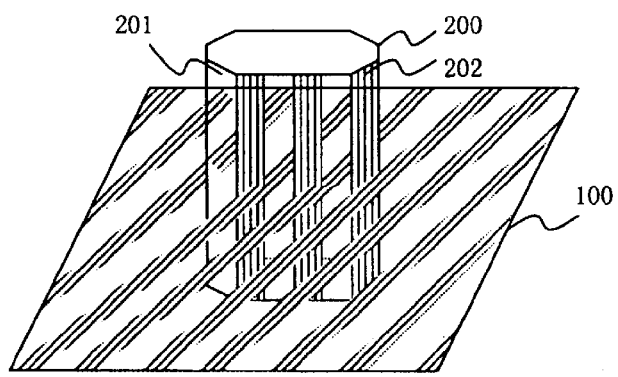
FIG. 8 is a diagram showing an example image display (5) according to the embodiment of the present invention.

In FIG. 8 is shown an image display when the opaque pixel depth write flag is in the ON state and the translucent pixel depth write flag is in the OFF state, i.e., when the Z coordinate of an opaque pixel is written in the depth buffer 23 and the Z coordinate of a translucent pixel is not written therein, and when the prism 200 is drawn earlier than is the plane 100.

When the image in FIG. 8 is compared with that in FIG. 10, at a portion above the intersecting portion 300 (see FIG. 10), whereat the plane 100 and the prism 200 overlap, i.e., at a portion whereat the prism 200 should be displayed in front of the plane 100, the translucent portions 201 of the prism 200 are still displayed behind the plane 100, while the opaque portions 202 of the prism 200 are displayed in front of the plane 100.

Figure 9:
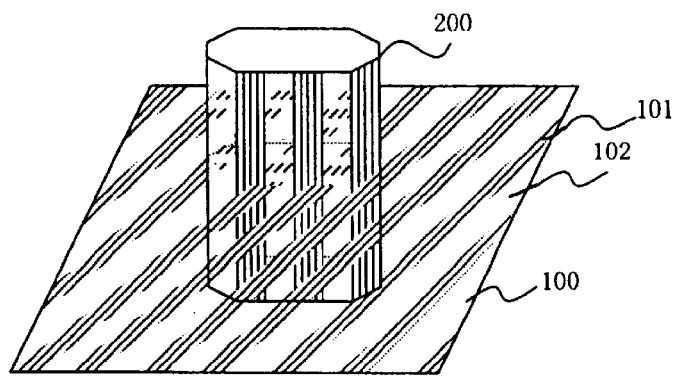
FIG. 9 is a diagram showing an example image display (6) according to the embodiment of the present invention.
Figure 10:
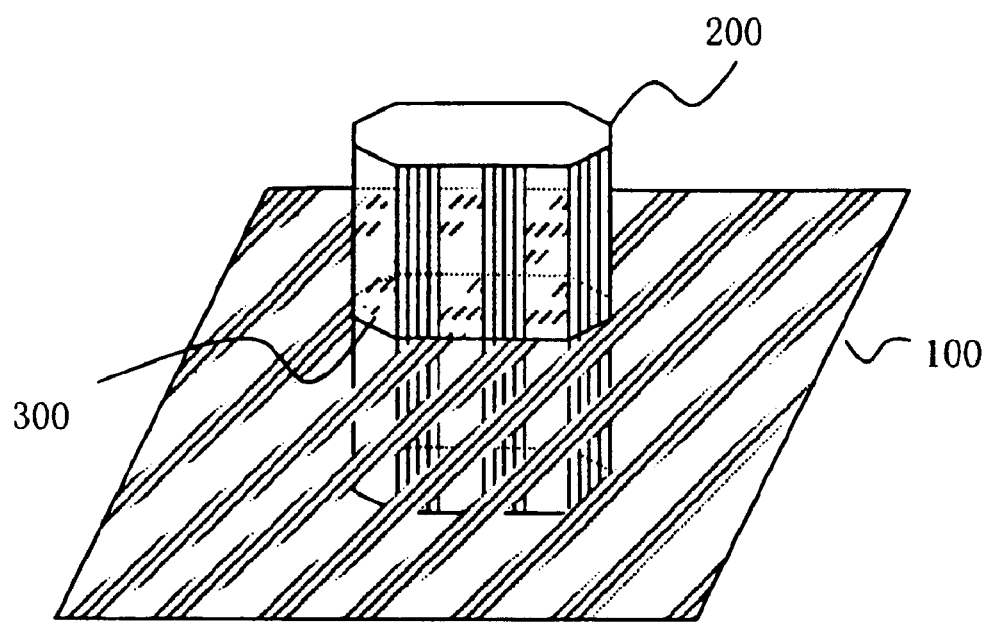
FIG. 10 is a diagram showing an ideal image display when objects intersect each other.

In FIG. 9 is shown an image display when the opaque pixel depth write flag is in the ON state and the translucent pixel depth write is in the OFF state, and when the plane 100 is drawn earlier than the prism 200.

When the image in FIG. 9 is compared with that in FIG. 10, at a portion below the intersecting portion 300 (see FIG. 10), whereat the plane 100 and the prism 200 overlap, i.e., at a portion where the plane 100 should be displayed in front of the prism 200, the translucent portion 101 of the plane 100 is still displayed behind the prism 200, while the opaque portion 102 of the plane 100 is displayed in front of the prism 200.

As is described above, according to the present invention, a transparency for a pixel is employed to determine whether the Z coordinate of the pixel should be written in the depth buffer. Therefore, when the objects which are constituted by polygons wherein opaque pixels and translucent pixels coexist intersect each other, the variation of image patterns to be displayed is increased. Since the writing control is performed under simple conditions, i.e., in accordance with the transparency of a pixel, an image closer to the ideal one can be selected without substantially increasing the load imposed on the rendering circuit 21.

As is described above, the image display apparatus of the present invention examines the transparency of a pixel to determine whether the Z coordinate of the pixel should be written in the depth buffer. Therefore, when the objects which are constituted by polygons, wherein opaque pixels and translucent pixels coexist, intersect each other, the variation in the display of image patterns which are to be displayed is increased. Since the writing control is performed under simple conditions, i.e., in accordance with the transparency of a pixel, an image closer to the ideal one can be selected without substantially increasing the load imposed on the rendering circuit 21.

The present invention may be embodied in other specific forms without departing from the spirit or essential characteristics thereof. The present embodiment is therefore to be considered in all respects as illustrative and not restrictive, the scope of the invention being indicated by the appended claims rather than by foregoing description and all change which come within the meaning and range of equivalency of the claims are therefore intended to be embraced therein.

What is claimed is:

1. An image display apparatus for displaying polygons, each of which is located in a virtual three-dimensional space of an XYZ coordinate system based on a viewpoint and is constituted by at least one pixel having XYZ coordinates, on the two-dimensional plane of an XY coordinate system comprising:

a storage unit in which a Z coordinate corresponding to predetermined XY coordinates is written;

a comparing unit for comparing whether a Z coordinate of a predetermined pixel is nearer to the viewpoint than an another Z coordinate written in the storage unit;

a determination unit for determining the transparency of the predetermined pixel, including whether the predetermined pixel is translucent or opaque, when the Z coordinate of the predetermined pixel is nearer to the viewpoint than the another Z coordinate written in the storage unit;

a first flag for controlling Z coordinate writing of opaque pixels in the storage unit;

a second flag for controlling Z coordinate writing of translucent pixels in the storage unit;

a writing control unit for controlling whether to write the Z coordinate of the predetermined pixel in the storage unit based on the transparency of the pixel as determined by the determination unit and based on a state of the first flag if the predetermined pixel is determined to be opaque and on a state of the second flag if the predetermined pixel is determined to be translucent; and a display unit for displaying the predetermined pixel at the predetermined XY coordinates.

2. An image display method for displaying polygons, each of which is located in the virtual three-dimensional space of an XYZ coordinate system based on a viewpoint and is constituted by at least one pixel having XYZ coordinates, on the two-dimensional plane of an XY coordinate system comprising the steps of:

comparing whether a Z coordinate of a pixel is nearer to the viewpoint than an another Z coordinate written in a storage unit for storing a pixel having predetermined XY coordinates;

determining a transparency of the pixel, including determining whether the pixel is translucent or opaque, when the Z coordinate of the pixel is nearer to the viewpoint than the Z coordinate written in the storage unit;

controlling whether to write the Z coordinate of the pixel in the storage unit based on the transparency of the pixel as determined in the determining step and based on a state of a first flag if the pixel is determined to be opaque and on a state of a second flag if the pixel is determined to be translucent; and displaying, at predetermined XY coordinates, the pixel.

3. A memory medium for storing a program for displaying polygons, each of which is located in a virtual three-dimensional space of an XYZ coordinate system based on a viewpoint and is constituted by at least one pixel having XYZ coordinates, on the two-dimensional plane of an XY coordinate system, the program comprising the steps of:

comparing whether a Z coordinate of a pixel is nearer to the viewpoint than an another Z coordinate written in a storage unit for storing a pixel having predetermined XY coordinates;

determining a transparency of the pixel, including determining whether the pixel is translucent or opaque, when the Z coordinate of the pixel is nearer to the viewpoint than the Z coordinate written in the storage unit;

controlling whether to write the Z coordinate of the pixel into the storage unit based on the transparency of the pixel as determined in the determining step and based on a state of a first flag if the pixel is determined to be opaque and on a state of a second flag if the pixel is determined to be translucent; and displaying, at predetermined XY coordinates, the pixel.

* * * * *